Patented Dec. 15, 1936

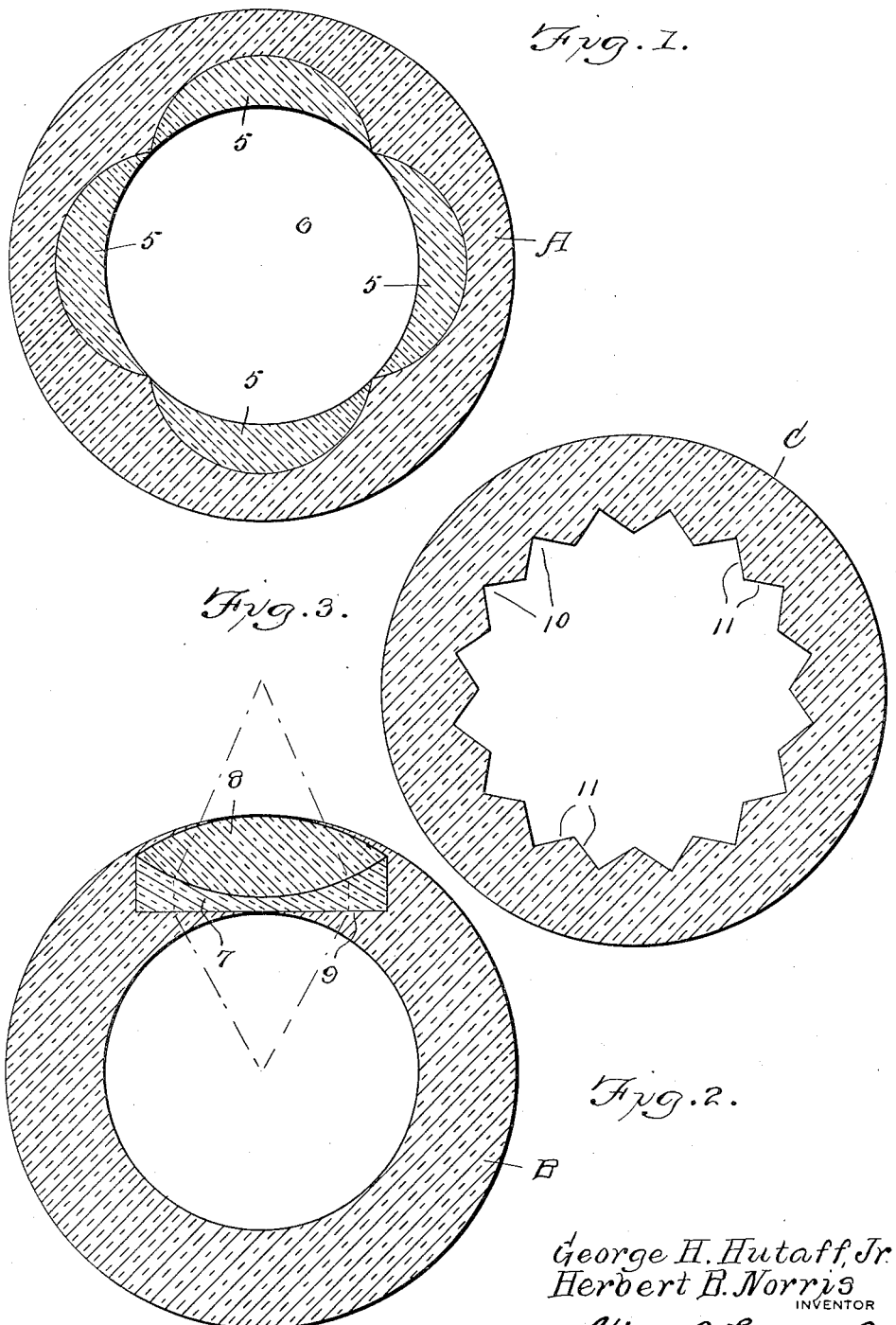

2,063,930

UNITED STATES PATENT OFFICE 2,063,930

LENSED ELECTRIC LIGHTING GLASS TUBING

George H. Hutaff, Jr., Wilmington, and Herbert B. Norris, Raleigh, N. C.

Application June 28, 1935, Serial No. 28,935

3 Claims. (Cl. 176—122)

The invention relates to a lensed electric lighting glass tubing and more especially to a lensed gaseous conduction lamp.

The primary object of the invention is the provision of a tubing or lamp, wherein prisms are formed interiorly thereof or lenses arranged therewith so that light rays on illumination will be rendered sharp so as to materially increase the projecting of the light rays and thus rendering the tubing or lamp serviceable for sidewalk lighting, subway station lighting or other places, more especially when the lamp or the tubing is confined within a wall and covered with a transparent plate or glass, the lensed feature being adaptable for use with "neon" gas and mercury vapor lamps or tubing.

Another object of the invention is the provision of a tubing or lamp of this character, wherein the construction thereof is novel in form so as to assure maximum projection of light under illumination thereof and assures sharpness to the light.

A further object of the invention is the provision of a tubing or lamp of this character, which is simple in construction, highly efficient, novel and attractive in appearance as well as inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a vertical transverse sectional view through an electric lighting glass tubing showing the lenses fitted therein in accordance with the invention.

Figure 2 is a view similar to Figure 1 showing a modification.

Figure 3 is a view similar to Figure 2 showing a further modification.

Similar reference characters indicate corresponding parts throughout the several views in the drawing.

Referring to the drawing in detail, particularly Figure 1 there is shown a portion of an electric lighting glass tubing A which is employed for service as a gaseous conduction lamp and arranged interiorly of this tube at diametrically opposite points are the concavo-convex lenses 5, these being concentrically disposed with respect to the gaseous space 6 interiorly thereof and meet each other at edges adjacent one another, the lenses 5 being longitudinally disposed and are counterseated in the body of the tubing A so that the convexed faces thereof present a true circular wall interiorly of the tubing and such lenses function to project light rays from within the tubing when illuminated while serving as a gaseous conduction lamp.

In Figure 2 of the drawing the tubing B, which is similar to the tubing A, has arranged in the light projecting side or area thereof an inner concaved lens 7 and an outer double convexed lens 8 confronting said lens 7, these being interfitted and are embedded in the body of the tubing B so that light rays emanating from a central longitudinal axis within the tubing B pass through the concaved lens 7 and the convexed lens 8 to be focused without the said tubing and productive of a sharp light beam at this point. These lenses are fitted within a seat 9 created within the body of the tubing B to be held in matched relation to each other in their interfitting disposition.

In Figure 3 of the drawing there is shown a further modification wherein the tubing C has formed at the interior wall thereof corrugations 10 providing prism bodies 11, these being for reflectory purposes for directing light rays emanating interiorly of the tubing C from a central point thereof to without the tubing and entirely about the same.

What is claimed is:

1. A gaseous conduction lamp having a tubing with a lensed area therein, the lensed area being formed with corrugations presenting prisms concentrically disposed to the longitudinal center of the tubing.

2. A gaseous conduction lamp having a tubing with a lensed area therein, the lensed area being concentrically disposed to the longitudinal center of the tubing.

3. A gaseous conduction lamp having a tubing with a lensed area therein, the outer surface of said tubing forming a true circle, the lensed area lying between the inner and outer surfaces of said tubing and concentric to the center axis of said tubing.

GEORGE H. HUTAFF, Jr.
HERBERT B. NORRIS.